US010313352B2

(12) United States Patent
Kuo et al.

(10) Patent No.: US 10,313,352 B2
(45) Date of Patent: Jun. 4, 2019

(54) PHISHING DETECTION WITH MACHINE LEARNING

(71) Applicant: International Business Machines Corporation, Armonk, NY (US)

(72) Inventors: Jeff H. C. Kuo, Taipei (TW); Chien Pang Lee, Taipei (TW); John K. C. Lee, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 15/334,766

(22) Filed: Oct. 26, 2016

(65) Prior Publication Data

US 2018/0115565 A1  Apr. 26, 2018

(51) Int. Cl.
H04L 29/06 (2006.01)

(52) U.S. Cl.
CPC ........ H04L 63/101 (2013.01); H04L 63/1408 (2013.01); H04L 63/1483 (2013.01)

(58) Field of Classification Search
None
See application file for complete search history.

(56) References Cited

U.S. PATENT DOCUMENTS

| 8,578,166 | B2 * | 11/2013 | De Monseignat | H04L 63/0823 |
| | | | | 713/175 |
| 9,215,242 | B2 * | 12/2015 | Varenhorst | H04L 63/1416 |
| 9,218,482 | B2 * | 12/2015 | Ma | G06F 17/3089 |
| 9,253,208 | B1 * | 2/2016 | Koshelev | H04L 63/1483 |
| 9,282,117 | B2 | 3/2016 | Schmidtler | |
| 9,621,570 | B2 * | 4/2017 | Koshelev | H04L 63/1483 |
| 10,069,856 | B2 * | 9/2018 | Alsaleh | H04L 63/1433 |
| 2007/0118528 | A1 * | 5/2007 | Choi | H04L 51/12 |
| 2007/0192855 | A1 | 8/2007 | Hulten et al. | |
| 2014/0096242 | A1 * | 4/2014 | Dong | H04L 63/1483 |
| | | | | 726/22 |
| 2014/0298460 | A1 | 10/2014 | Xue et al. | |

(Continued)

FOREIGN PATENT DOCUMENTS

| CN | 101826105 A | 9/2010 |
| CN | 101820366 B | 9/2012 |

(Continued)

OTHER PUBLICATIONS

Kuo et al., "Phishing Detection with Machine Learning," U.S. Appl. No. 15/857,113, filed Dec. 28, 2017.

(Continued)

*Primary Examiner* — Christopher A Revak
(74) *Attorney, Agent, or Firm* — Nathan M. Rau (57) ABSTRACT

A system and method for identifying a phishing website is disclosed. Content associated with a website that a user is attempting to access is retrieved and translated into a format that a classifier can process. The classifier is trained to identify phishing attempts for a particular website or family of websites. The classifier processes the website to determine if the website is a phishing website. A scorer can determine the likelihood that the classifier classified the website correctly. If the website is determined to be a phishing website a protection component can deny access to the website. Otherwise the user can be permitted to access the website.

19 Claims, 5 Drawing Sheets

(56) References Cited

U.S. PATENT DOCUMENTS

| | | |
|---|---|---|
| 2014/0359760 A1 | 12/2014 | Gupta et al. |
| 2015/0264086 A1 | 9/2015 | Feng et al. |
| 2016/0253679 A1* | 9/2016 | Venkatraman ..... G06Q 30/0185 705/310 |

FOREIGN PATENT DOCUMENTS

| | | |
|---|---|---|
| CN | 102932348 A | 2/2013 |
| CN | 103379111 A | 10/2013 |

OTHER PUBLICATIONS

List of IBM Patents or Patent Applications Treated as Related, Signed Dec. 28, 2017, 2 pages.

Afroz et al., "PhishZoo: Detecting Phishing Websites by Looking at Them," 2011 Fifth IEEE International Conference on Semantic Computing (ICSC), Sep. 2011, 8 pages. DOI: 10.1109/ICSC.2011.52.

Basnet et al., "Rule-Based Phishing Attack Detection," Proceedings of the International Conference on Security and Management—CAM'11, Jul. 2011, 7 pages.

Belabed et al., "A personalized whitelist approach for phishing webpage detection," 2012 Seventh International Conference on Availability, Reliability and Security (ARES), Aug. 2012, pp. 249-254. DOI: 10.1109/ARES.2012.54.

Lee et al., "Poster: User-Centric Phishing Threat Detection," Conference Paper, Conference: In Poster Session of the 34th IEEE Symposium on Security and Piracy, S&P 2013, May 2013, 3 pages.

Mell et al., "The NIST Definition of Cloud Computing," Recommendations of the National Institute of Standards and Technology, Special Publication 800-145, Sep. 2011, 7 pages, National Institute of Standards and Technology, Gaithersburg, MD.

Deore et al., "Phishing Information Identification using SVM Algorithm," International Journal of Innovations in Engineering and Technology (IJIET), Apr. 2015, vol. 5, Issue 2, pp. 61-65.

Feroz, M. "Examination of Data, and Detection of Phishing URLs using URL Ranking," Thesis in Computer Science, Aug. 2015, 103 pages.

Krisfinan et al., "Phishing Website Detection System Based on Enhanced iTree Classifier," ARPN Journal of Engineering and Applied Sciences, Aug. 2015, vol. 10, No. 14, pp. 5688-5699.

Sahu et al., "Kernel K-Means Clustering for Phishing Website and Malware Categorization," International Journal of Computer Applications (0975-8887), Feb. 2015, vol. 111, No. 9, pp. 20-25.

* cited by examiner

PHISHING DETECTION WITH MACHINE LEARNING

BACKGROUND

The present disclosure relates to identifying a phishing website, and more specifically, to detecting a phishing website using machine learning.

Often times users of computer systems encounter internet sites that are attempting to obtain personal or sensitive information from the user. This is referred to as phishing. One of the reasons for phishing is to commit identity theft. Phishing occurs a number of different ways. Typically, a phishing attempt occurs through email. In this instance the recipient receives an email that purports to be from a known source, such as the recipient's bank or credit card company. Many of these emails contained spoofed email addresses to appear as though the originated from the known source. The content of the email often appears to be genuine, and typically instructs the recipient to click a link in the email to perform a series of actions. The link appears to be from the known source, however, the link takes the recipient to an internet site that purports to be the known site. The site often has the look and feel of the known site.

SUMMARY

One embodiment is directed to a system of identifying a phishing attempt against a target website. The system includes a classifier that is configured to classify a website as belonging to a target web site or not according to a set of rules. The classifier is trained against a set of training data, that is specific to a single owner. They system further includes a scorer configured to generate a score indicative of a likelihood that the classifier has correctly identified the website as either a phishing website or not a phishing website. The system further includes a protection component configured to grant or deny access to the website based upon the generated score from the scorer. The protection component can deny access to the website if the website is determined to be a phishing website. Once the system identifies that page content of input URL belongs to the target website and that URL doesn't belong to that target website, the URL is highly suspicious as a phishing attempt.

Another embodiment is directed to a method and computer program product to identify a phishing attempt. The method begins by retrieving content associated with a website that a user is attempting to access. Next the content of the website is translated into a format that a classifier can use. The content is passed through the classifier to determine if the website is a phishing website. If the website is determined to be a phishing website access can be denied. Otherwise the user can be permitted to access the website.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to identifying phishing websites based upon machine learning and whitelists. While the present disclosure is not necessarily limited to such applications, various aspects of the disclosure may be appreciated through a discussion of various examples using this context.

The present disclosure is directed to a system and method for detecting a phishing internet site. Often times users of computer systems encounter internet sites that are attempting to obtain personal or sensitive information from the user. One of the reasons for phishing is to commit identity theft. Phishing occurs a number of different ways. Typically, a phishing attempt occurs through email. In this instance the recipient receives an email that purports to be from a known source, such as the recipient's bank or credit card company. Many of these emails contained spoofed email addresses to appear as though the originated from the known source. The content of the email often appears to be genuine, and typically instructs the recipient to click a link in the email to perform a series of actions. The link appears to be from the known source, however, the link takes the recipient to an internet site that purports to be the known site. The site often has the look and feel of the known site. However, there are often clues in the site that allow for an alert user to identify that the site is in fact not from the known source. These can include lacking a security certificate (e.g. https), misspelling of words, different web address from the one purported in the email, etc. However, if the recipient does not catch these items and begins to interact with the site, the phisher may be successful in obtaining the desired personal information. The present disclosure provides a system and method for identifying a phishing attempt.

Figure 1:
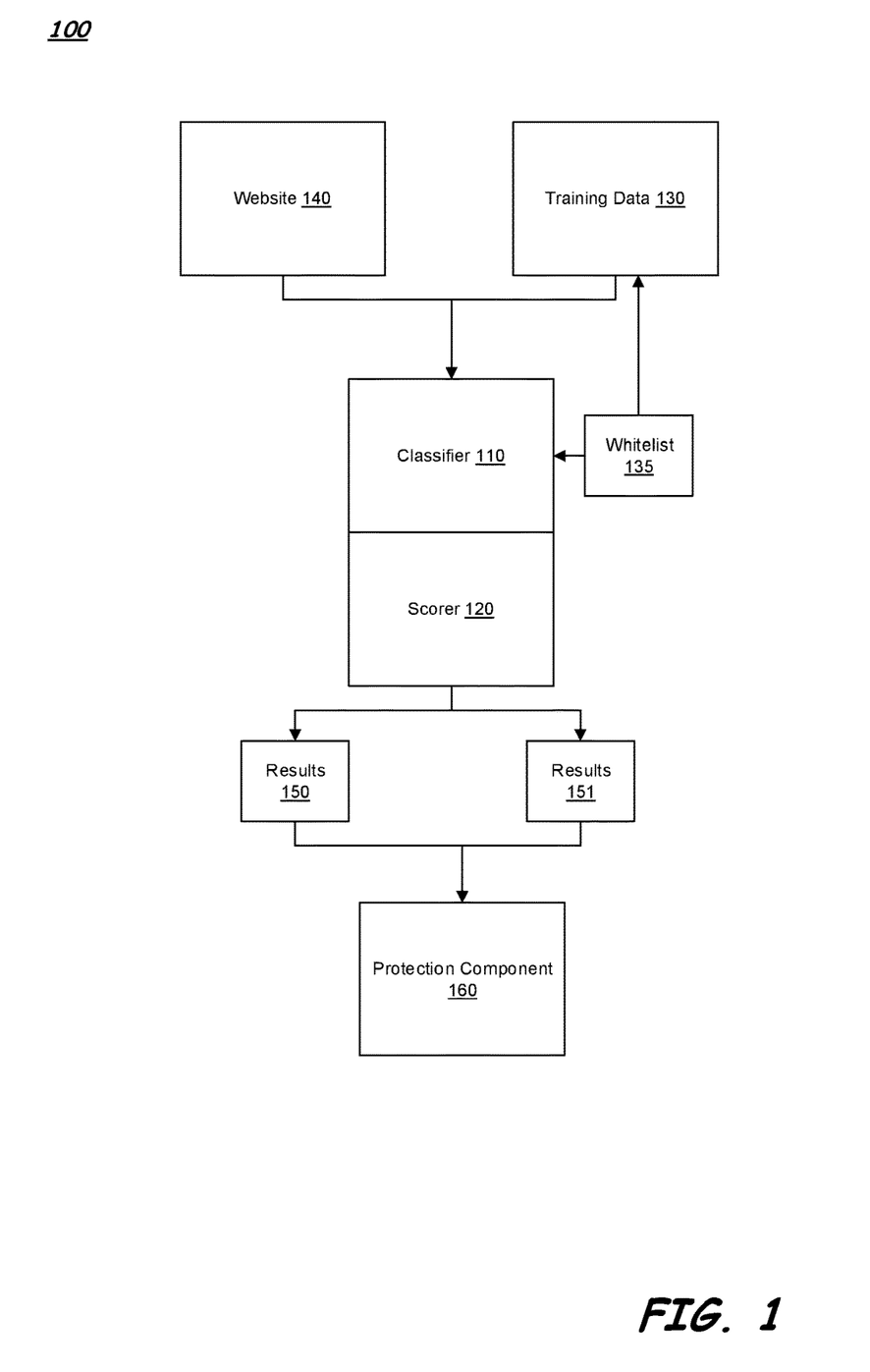
FIG. 1 is a block diagram illustrating a system for identifying a phishing site according to one illustrative embodiment.

FIG. 1 is a block diagram illustrating a system for identifying a phishing site according to embodiments of the present disclosure. System includes a classifier, a scorer, training data, and a whitelist 135. In contrast to other systems that identify phishing sites the system does not contain a black list of sites that are known to be phishing sites.

The classifier 110 is a component of the system that is configured to classify a data set according to a set of rules. The set of rules that are used by the classifier 110 are designed to look at the data set that is input and each feature of the data set and determine a particular output based on the combination of the features of the data set. For example, the classifier 110 may be configured to determine if website is a phishing website. In this instance each of the features that appear in the data set provide information to the classifier 110 as to if the transaction is or is not fraudulent. The classifier 110 is trained using training data 130 that has features in the training data 130 that should result in a particular result from the classifier 110. The more training data 130 that is processed through the classifier 110 the more the classifier 110 is able to tune or modify the rules that are used to generate a particular output. The classifier 110 can use any rules or processes available to classify or otherwise produce the output from the input data, such as training data 130, whitelist 135, website 140 as an input, and results 150 and 151 as an output.

In one embodiment the classifier 110 is a support vector machine. A support vector machine is a non-probabilistic binary linear classifier 110 that assigns examples that are processed through it to one category or another. (e.g. target site or other site to be protected from a phishing attack). The support vector machine builds a support vector machine model that is a representation of the examples from training data that are mapped as points in space so that the two categories are divided by a gap in the space that is as wide as possible. The support vector machine classifies new examples (e.g. websites) based on which side of the gap the example falls onto. However, the classifier 110 may be any type of classifier 110.

The output 150/151 of the classifier 110 can simply contain the determined result. That is, for example, that the input website is a phishing site or a safe site. However, in some embodiments the output also includes a probability that the determination by the classifier 110 is in fact correct. To obtain the probability the classifier 110 passes the output through a scorer 120. The scorer 120 can be part of the classifier 110 or it may be a separate component of the system. The scorer 120 is configured to calculate the likelihood that the classifier 110 has produced the correct result. Alternatively, the scorer 120 is configured to identify the portion of the results that caused the classifier 110 to classify the result in the manner that it did. For example, if the classifier 110 merely outputs a score for the classification and that score is compared to a rule for the decision, the scorer 120 can calculate the difference between the determined score and the score needed to cause the decision to be made. The scorer 120 can use any method, process or means for calculating the probability or score. This information can assist the developer of the system in identifying potentially new approaches that are being used by the phishing sites to mimic legitimate sites.

The set of training data 130 is a set of data that is used to train the classifier 110. The training data 130 has a number of data sets that are designed to produce a first result and a number of data sets that are designed to produce a second result. Depending on the intent of the classifier 110 there may be more training data 130 data sets that are designed to produce different results. Each of the data sets in the training data 130 has a number of features that are present in the data set that help cause the data set to cause the classifier 110 to report the particular data set in a particular way. By passing each of the training data 130 sets through the classifier 110 the classifier 110 is able to become calibrated to the specific data results that the user or other organization desires.

The training data includes both positive and negative items related to the sites to be protected. Positive items are items that related to websites that are known to be phishing websites or target/benign sites which s phishing site is attempting to fake. Some of these positive items can come from repositories of known phishing sites. This information may come from organizations such as PhishTank, pages from target benign sites, or may be maintained by the organization desiring the protection. Conversely, negative items are all items that are not related to target websites that are known to be safe. This can include information and data used by classifier to differentiate sites from the target organizations. By using both positive and negative items the classifier 110 can be adequately trained to identify a target site. The training data may also be augmented with information related to false positives that had been previously identified. A false positive is a website that was identified as a target site, but is associated with a different website.

In some embodiments, at least a portion of the training data 130 includes a whitelist 135. The whitelist 135 is a data set or sets that maintains information and data about target sites. In some embodiments the whitelist 135 is specific to a particular company. For example, the whitelist 135 may be for a company such as IBM, and only contain data related to websites that are known to be IBM websites. However, the whitelist 135 could be used for any company or organization that could be the target of a phishing attack (e.g. PAYPAL, AMAZON, APPLE, banks, airlines, governments, etc). In other embodiments the whitelist 135 maintains information and data for a number of different companies whose websites could be a target for phishing attacks. However, maintaining a whitelist 135 for a number of companies results in a trade-off in the efficiency of the classifier 110. More companies that are present in the whitelist 135 can slow the performance of the system as a potential phishing site will be compared against a larger data set of companies that may not have the same or similar features.

The information and data contained in the whitelist 135 is specific to the company that the system is designed to detect a phishing attempt for. This information can include web addresses for all of the websites used by the company, logos associated with the company, text (lexical features) associated with the company's web presence, the use of encrypt/decrypt APIs, etc. The amount and type of data contained in the whitelist 135 can vary depending on the particular implementations of the system, and the level of protection desired. The whitelist 135 can be used as a portion of the training data used for training the classifier 110 to determine if a potential phishing website.

Website 140 is illustrated as examples of an input that can be processed through the classifier 110 to determine is the corresponding website 140 is a phishing website or a legitimate website. The website 140 can be any type of website for any organization. In some embodiments website 140 are only those websites purporting to be from the organization or organizations that the classifier 110 is configured to identify phishing sites for.

Protection component 160 is a component of the system that determines whether or not to allow the user to have access to a particular website. Protection component 160 consumes the results 150/151 of the classification from the classifier 110 and based on the determination that a website 140 is a phishing site or not blocks access to the website 140. Once they system identifies that a page content of input URL belongs to the target website and that URL doesn't belong to that target website, the URL can be considered highly suspicious as a phishing URL. In some embodiments the protection component 160 can use the information from the scorer 120 in determining whether or not to allow access to the website 140. For example, the protection component 160 can compare the score for the classification against a threshold value. If the score indicating that the site is a phishing site is above the threshold value the protection component 160 can block access to the site, and if it is below the threshold value can allow access to the website 140. In some embodiments the protection component can use the threshold value to determine if an alert should be provided to the user indicating the likelihood that the particular website 140 is a phishing site, and only allow access to the website if the user acknowledges the risk.

Figure 2:
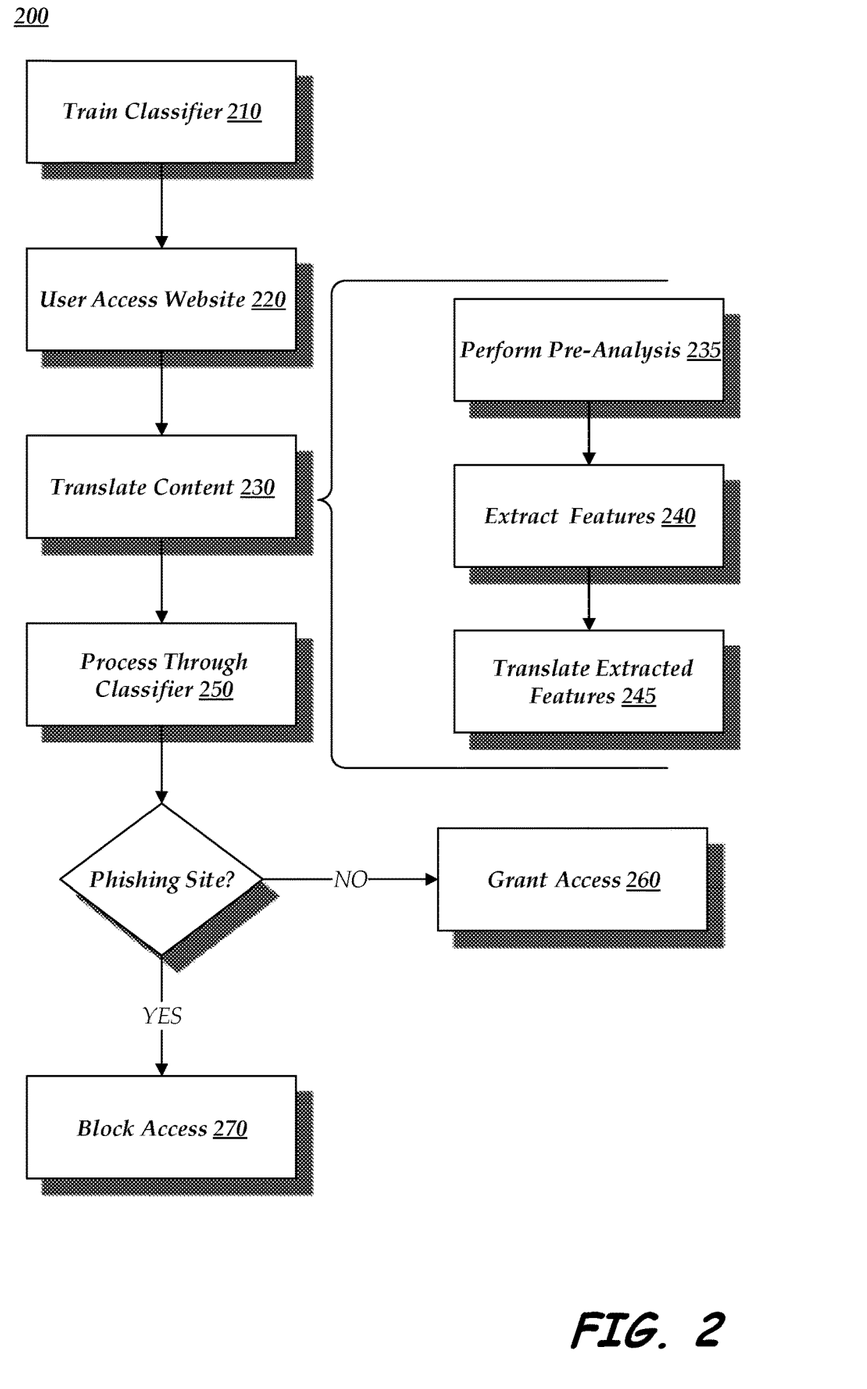
FIG. 2 is a flow diagram illustrating a process for providing protection against a phishing website according to illustrative embodiments.

FIG. 2 is a flow diagram illustrating a process for providing protection against a phishing website according to at least one illustrative embodiment. The process begins by training the classifier 110 to identify a target website. This is illustrated at step 210. At this step in the process the training data 130 is processed through the classifier 110. The classifier 110 reports on the results of each of the data sets in the training data 130. A user or other system reviews the results from each of the processed data sets and makes adjustments to the rules used by the classifier 110 to cause the classifier 110 to report correctly on each of the inputted data sets. The process to calibrate the classifier 110 can be any training process available.

Once the classifier 110 has been trained the process waits for a user to access a particular website or service. Once the user accesses the website the content of the website is retrieved. This is illustrated at step 220. The content is received by the system and is not yet displayed to the user. The content may be received through a Hypertext Transfer Protocol (HTTP(s)). However, any protocol for transmitting a website or data to an endpoint can be used. The content is received and prepared for analysis.

Once the content has been retrieved the content is translated in to a format that can be processed through the classifier 110. This is illustrated at step 230. A pre-analysis of the content can be done at this step. In some embodiments this pre-analysis compares the content against the whitelist 135. This is illustrated at step 235. At this step the URL for the website may be compared against the list of URLs in the whitelist 135. If the URL is found in the whitelist 135 the process may at this point skip ahead to step 260. In this approach the more costly analysis of the content of the website can be eliminated. However, in some embodiments the process continues on to analyze the content of the website as it is received.

Once the pre-analysis has been completed, the lexical features of the website are retrieved. This is illustrated at step 240. At this step the lexical features of the website are extracted. In some embodiments only a specific portion of the website is extracted. For example, in a PayPal site that has as a portion of the HTML content <a>enter PayPal password<a> the terms "Enter" "PayPal" and "Password" will be extracted. However, in some embodiments more or less lexical features of the website will be extracted. For example, at this step the stop words may be removed as they are not valuable in determining the source or legitimacy of the website. However, in other instances the misplacement of the stop words can be indicative of a fake website. Some phishing websites use tricks to appear legitimate such as using encryption to prevent the detection of the phishing activity. In these instances, the system can extract image sizes from the content and use that information to assist in the determination of the legitimacy of the website. Additionally, the system can use "Flag to use encrypt/decrypt APIs" to assist in determining the legitimacy of the website.

The extracted information from the content is then translated to the format expected by the classifier 110. This is illustrated at step 245. For example, if the classifier 110 is a support vector machine and trained to detect PayPal phishing the terms "Enter" "PayPal" and "Password" can be translated into vector space. However, other methods can be used for converting the terms to the correct format.

Once the content has been converted to the format needed for the classifier 110, it is processed through the classifier 110 and alternatively the scorer as well. This is illustrated at step 250. The classifier 110 processes the content and based on the rules generated during the training stage determines if the website is likely to be a phishing website or is a legitimate website from the intended provider. If the website is determined to be legitimate the access is granted at step 260. If the website is determined to be a phishing site then access to the website is blocked at step 270. In some embodiments the user will be presented with a notification that access was blocked to the site. In some embodiments the user may be notified of the likelihood that the website was a phishing site and/or may be presented with information indicating why the classifier 110 determined that the website was likely a phishing site. In some embodiments the user may be able to override the block, such as in an instance where the user knows that the site is a legitimate site. This could occur when the company is in the process of rebranding itself and allows the user to access a beta site for purposes of testing. If the user overrides this blocking the particular website can be added to the whitelist 135 or may be labeled as a false positive. This information can then be referred back to the classifier 110 to assist in retraining or updating the classifier 110 to avoid false positives.

Figure 3:
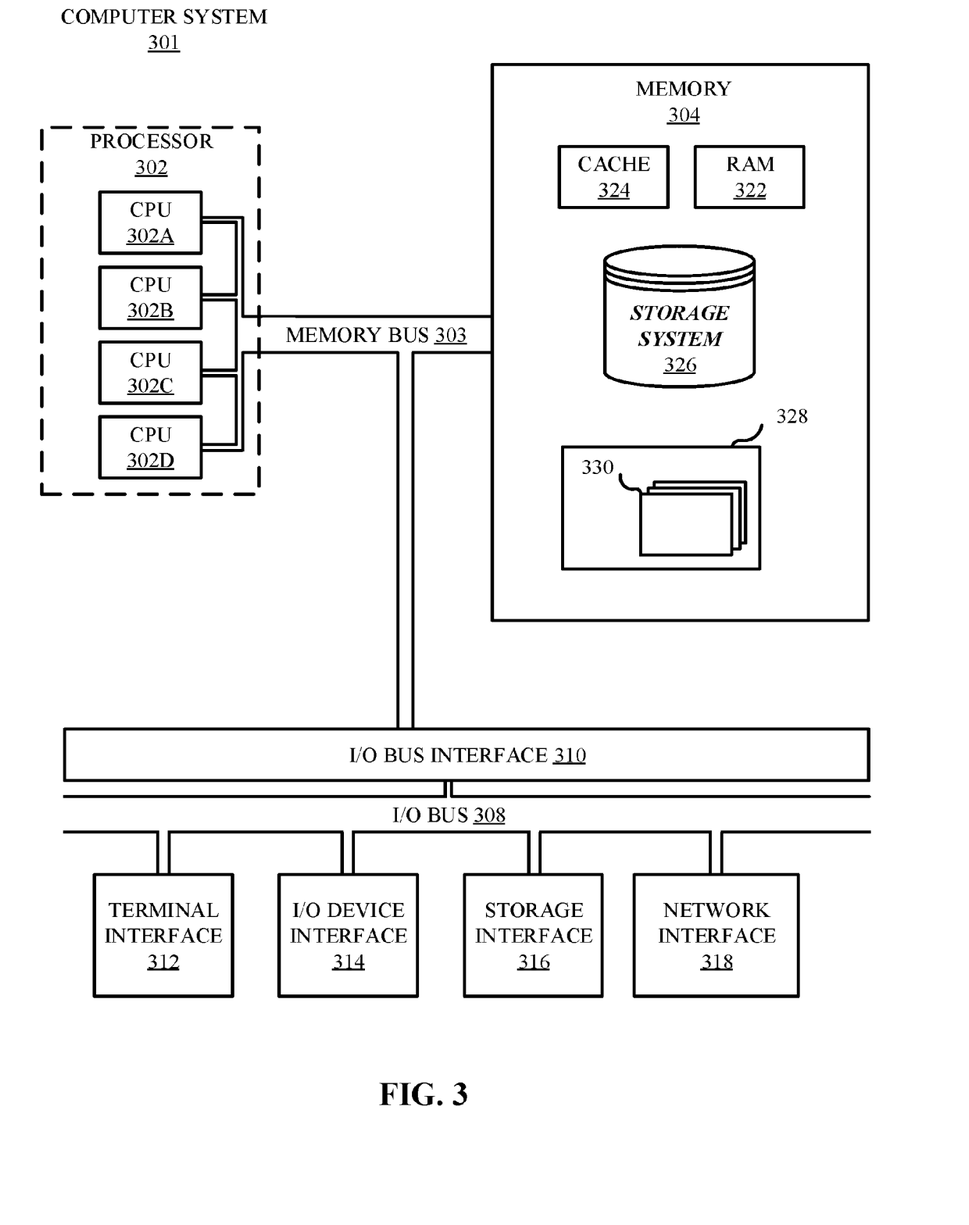
FIG. 3 is a block diagram illustrating a computing system according to one embodiment.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single respective units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
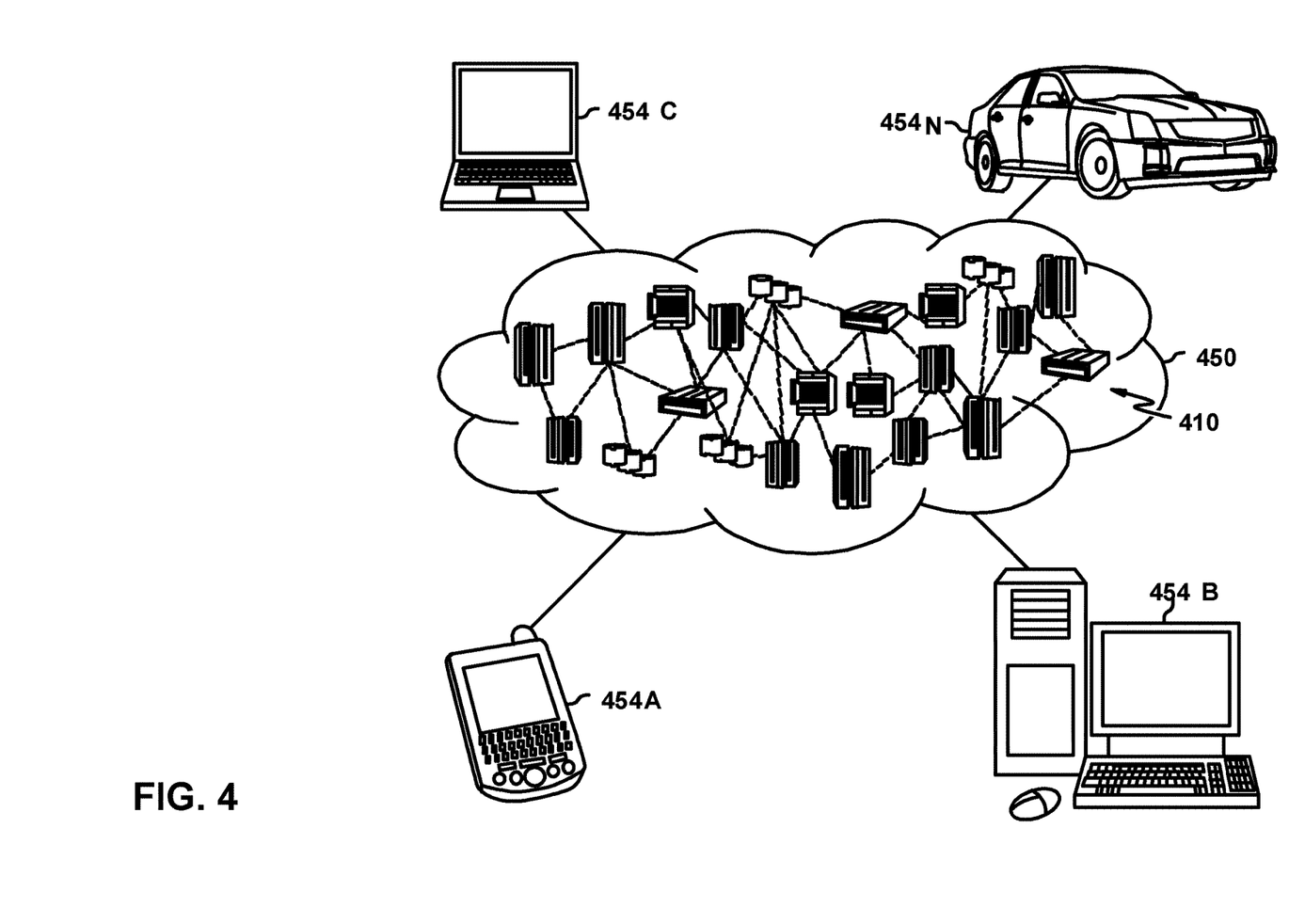
FIG. 4, is a diagrammatic representation of an illustrative cloud computing environment.

The application 180 may be employed in a cloud computing environment. Further, both the testing tool 110 and the monitoring tool 150 may also be employed in a cloud computing environment. FIG. 4, is a diagrammatic representation of an illustrative cloud computing environment 450 according to one embodiment. As shown, cloud computing environment 450 comprises one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 10 and cloud computing environment 450 may communicate with any type of computerized device over any type of network and/or network addressable connection (e.g., using a web browser).

Figure 5:
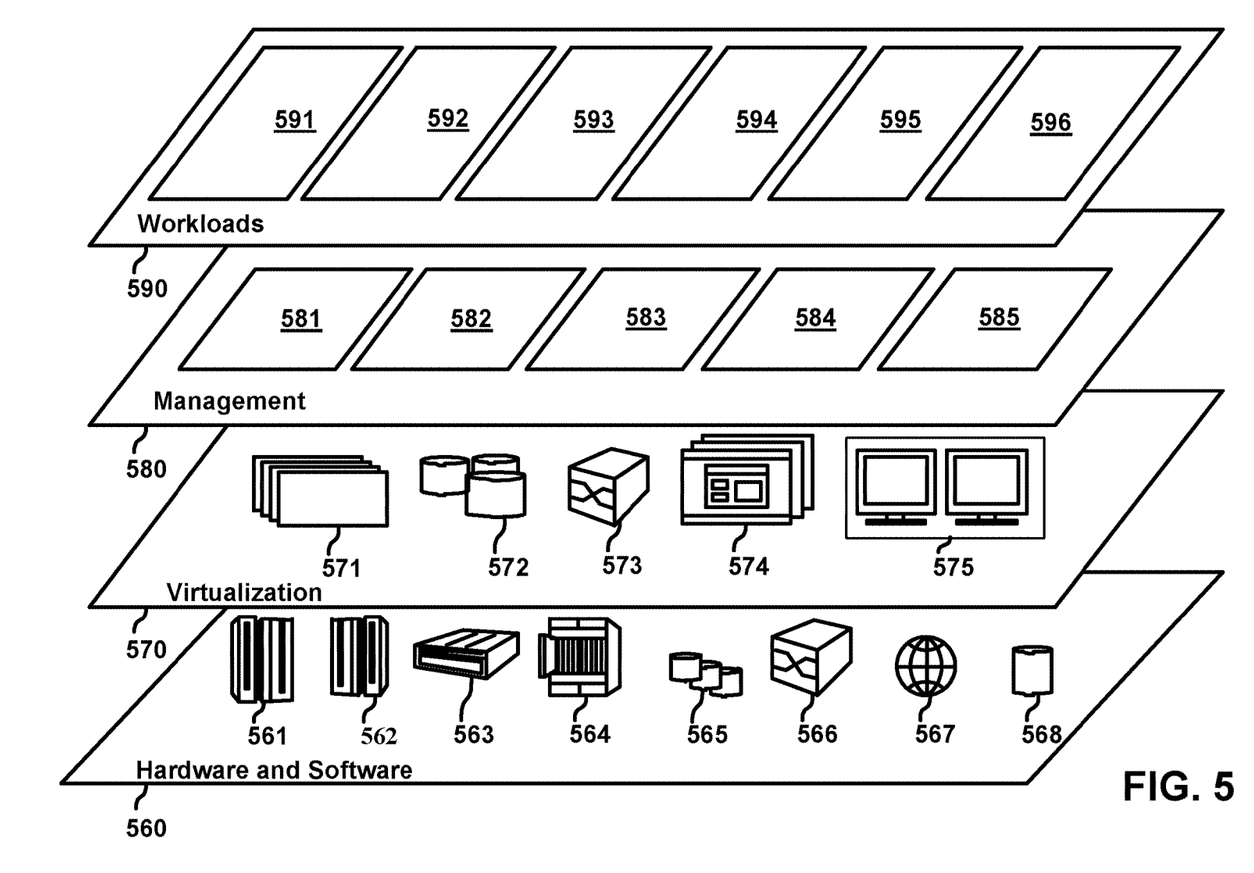
FIG. 5 illustrates a set of functional abstraction layers provided by cloud computing environment according to one illustrative embodiment.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and classification 596.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
   a processor;
   a memory;
   a classifier configured to classify a website as a target website or not according to a set of rules, the classifier trained against a set of training data, wherein the set of training data is specific to a single owner;
   a scorer configured to generate a score indicative of a likelihood that the classifier has correctly identified the website as either a phishing website or not a phishing website, wherein the score is determined by calculating a difference between a value required to classify a particular result from the classifier and an associated value output from the classifier; and
   a protection component configured to grant or deny access to the website based upon the generated score from the scorer.

2. The system of claim 1 further comprising:
   a whitelist, the whitelist including a plurality of websites known to belong to the single owner.

3. The system of claim 2 wherein the whitelist includes lexical features associated with the single owner.

4. The system of claim 2 wherein the whitelist includes logos associated with the single owner.

5. The system of claim 1 wherein the classifier is a support vector machine.

6. The system of claim 1 wherein the classifier is configured to preprocess the website prior to classifying the website.

7. The system of claim 6 wherein the classifier is configured to determine if an address associated with the website is in a whitelist of addresses and is further configured to process the website when the address is not found in the whitelist.

8. A method comprising:
retrieving content associated with a website:
translating the content into a format for a classifier to process;
processing the content through the classifier to determine if the website is a phishing website;
generating a score indicative of a likelihood that the classifier has correctly identified the website as either a phishing website or not a phishing website, wherein the score is determined by calculating a difference between a value required to classify a particular result from the classifier and an associated value output from the classifier;
granting, based on the score, access to the website when the website is determined not to be a phishing website; and
blocking, based on the score access to the website when the website is determined to be a phishing website.

9. The method of claim 8 further comprising:
training the classifier to identify phishing websites for only a single organization.

10. The method of claim 8 wherein translating further comprises:
performing a pre-analysis on the website;
extracting features from the website; and
translating the extracted features into the format for the classifier.

11. The method of claim 10 wherein extracting features extracts lexical features from the website.

12. The method of claim 10 wherein performing a pre-analysis compares an address associated with the website to a whitelist of addresses associated with a single organization.

13. The method of claim 12 wherein when the address is found in the whitelist, granting access to the website without processing the content through the classifier.

14. A computer program product stored on a computer readable storage device having computer executable instructions that when executed cause at least one processor to:
retrieve content associated with a website:
translate the content into a format for a classifier to process;
process the content through the classifier to determine if the website is a phishing website;
generate a score indicative of a likelihood that the classifier has correctly identified the website as either a phishing website or not a phishing website, wherein the score is determined by calculating a difference between a value required to classify a particular result from the classifier and an associated value output from the classifier;
grant, based on the score, access to the website when the website is determined not to be a phishing website; and
block, based on the score, access to the website when the website is determined to be a phishing website.

15. The computer program product of claim 14 further comprising instructions to:
train the classifier to identify phishing websites for only a single organization.

16. The computer program product of claim 14 wherein translating further comprises instructions to:
perform a pre-analysis on the website;
extract features from the website; and
translate the extracted features into the format for the classifier.

17. The computer program product of claim 16 wherein extracting features extracts lexical features from the website.

18. The computer program product of claim 16 wherein performing a pre-analysis compares an address associated with the website to a whitelist of addresses associated with a single organization.

19. The computer program product of claim 18 wherein when the address is found in the whitelist, granting access to the website without processing the content through the classifier.

* * * * *